US010023670B2

(12) United States Patent
Manzoni et al.

(10) Patent No.: US 10,023,670 B2
(45) Date of Patent: Jul. 17, 2018

(54) PERFLUOROELASTOMER

(71) Applicant: SOLVAY SPECIALTY POLYMERS ITALY S.p.A., Bollate (MI) (IT)

(72) Inventors: Claudia Manzoni, Bologna (IT); Milena Stanga, Origgio (IT); Margherita Albano, Milan (IT)

(73) Assignee: SOLVAY SPECIALTY POLYMERS ITALY S.p.A., Milan (IT)

( * ) Notice: Subject to any disclaimer, the term of this patent is extended or adjusted under 35 U.S.C. 154(b) by 11 days.

(21) Appl. No.: 15/210,690

(22) Filed: Jul. 14, 2016

(65) Prior Publication Data

US 2017/0008987 A1   Jan. 12, 2017

Related U.S. Application Data

(63) Continuation of application No. 13/148,062, filed as application No. PCT/EP2010/051506 on Feb. 8, 2010, now abandoned.

(30) Foreign Application Priority Data

Feb. 13, 2009   (EP) .................... 09152866

(51) Int. Cl.
 C08L 27/22   (2006.01)
 C08F 8/00    (2006.01)
 C08F 214/26  (2006.01)

(52) U.S. Cl.
 CPC ........ *C08F 214/262* (2013.01); *C08F 214/26* (2013.01)

(58) Field of Classification Search
 USPC ................. 525/326.3, 387; 524/546
 See application file for complete search history.

(56) References Cited

U.S. PATENT DOCUMENTS

| 4,035,565 A * | 7/1977 | Apotheker ............ C08F 214/18 524/545 |
| 4,243,770 A | 1/1981 | Tatemoto et al. |
| 4,564,662 A | 1/1986 | Albin |
| 4,694,045 A * | 9/1987 | Moore ................ C08F 214/262 525/276 |
| 4,745,165 A | 5/1988 | Arcella et al. |
| 4,789,717 A | 12/1988 | Giannetti et al. |
| 4,864,006 A | 9/1989 | Giannetti et al. |
| 4,943,622 A | 7/1990 | Naraki et al. |
| 5,919,878 A * | 7/1999 | Brothers ............. C08F 214/262 428/421 |
| 6,880,238 B1 | 4/2005 | Kumar et al. |
| 7,049,365 B2 | 5/2006 | Uschold et al. |

FOREIGN PATENT DOCUMENTS

| EP | 0 633 274 A1 | 1/1995 |
| EP | 633274 A1 * | 1/1995 |
| EP | 0 661 304 A1 | 7/1995 |
| EP | 1 308 467 A2 | 5/2003 |
| EP | 1308467 A2 * | 5/2003 |
| EP | 1 457 505 A1 | 9/2004 |
| EP | 1457505 A1 * | 9/2004 |
| EP | 1 626 068 A1 | 2/2006 |
| JP | 2005-126620 A | 5/2005 |
| WO | WO 1995/02634 A1 | 1/1995 |
| WO | WO 1999/32234 A1 | 7/1999 |
| WO | WO 2000/01758 A1 | 1/2000 |
| WO | WO 2007/096347 A1 | 8/2007 |
| WO | WO -2007/096347 A1 * | 8/2007 |
| WO | WO-2007/096347 A1 * | 8/2007 |
| WO | WO 2007/096348 A1 | 8/2007 |
| WO | WO 2008/003634 A1 | 1/2008 |
| WO | WO 2008/003635 A1 | 1/2008 |
| WO | WO 2008/003636 A1 | 1/2008 |

OTHER PUBLICATIONS

Anolick et al., "Soluble Perfluoropolymers", Advanced Materials, vol. 10 No. 15, pp. 1211-1214, 1998.

* cited by examiner

*Primary Examiner* — Mark Kaucher
*Assistant Examiner* — Henry Hu
(74) *Attorney, Agent, or Firm* — Arent Fox LLP

(57) ABSTRACT

A peroxide curable perfluoroelastomer comprising: recurring units derived from tetrafluoroethylene (TFE); recurring units derived from perfluoroethylvinylether (EVE), in an amount of between 2 and 17% by moles, with respect to total recurring units derived from TFE, perfluoromethylvinylether (MVE) and EVE; and recurring units derived from perfluoromethylvinylether (MVE), in an amount of between 23 and 35% by moles, with respect to total recurring units derived from TFE, perfluoromethylvinylether (MVE) and EVE. A process for its manufacture and its use for the manufacture of cured articles.

16 Claims, No Drawings

PERFLUOROELASTOMER

CROSS-REFERENCE TO RELATED APPLICATIONS

This application is a Continuation of U.S. patent application Ser. No.: 13/148,062, filed Aug. 5, 2011, now abandoned, which is a National stage entry of International Application No. PCT/EP2010/051506, filed Feb. 8, 2010which claims priority to European Patent Application No. 09152866.1, filed Feb. 13, 2009. The disclosure of the prior applications are hereby incorporated in their entirety by reference.

TECHNICAL FIELD

This invention pertains to certain perfluoroelastomer having improved thermal resistance, to a process for their manufacture, and to the cured articles obtainable therefrom.

BACKGROUND ART

Fluoroelastomer are synthetic rubbers designed for demanding service applications in hostile environments, endowed with outstanding chemical and thermal resistance.

Perfluoroelastomers having fully fluorinated backbones and typically based on copolymers of tetrafluoroethylene (TFE) and perfluoromethylvinylether (MVE), optionally comprising recurring units derived from cure-site containing monomers, represent in this domain top-edge class of materials, introduced into the market since late sixties.

Generally these TFE/MVE copolymers have roughly a 60/40 to 65/35 mol/mol composition, which enables achievement of required elastomeric behaviour; such copolymers generally also comprise recurring units derived from monomers comprising curing sites and/or end groups contemplating such cure sites. Typically, peroxide curing is preferred technique used for their vulcanization and moulding.

In the domain of fluoroplastomers, copolymers of TFE and perfluoroalkylvinylethers, in particular MVE, are also well-assessed materials. In this domain, combination of two or more perfluoroalkylvinylethers, has been already suggested.

Thus, EP 633274 A (AUSIMONT SPA) 11 Jan. 1995 discloses thermoprocessable copolymers of tetrafluoroethylene comprising recurring units derived from perfluoromethylvinylether and from at least one additional fluoromonomer, like, notably perfluoroethylvinylether. Similarly, WO 2007/096348 (SOLVAY SOLEXIS SPA) 30 Aug. 2007 discloses thermoplastic terpolymers of tetrafluoroethylene, perfluoromethylvinylether and perfluoroethylvinylether, suitable for extrusion moulding cable sheathings.

Amorphous plastomers of tetrafluorethylene, perfluoromethylvinylether and perfluoroethylvinylether have been aso described in the past. Thus, U.S. Pat. No. 5,919,878 (E.I. DUPONT DE NEMOURS) 6 Jul. 1999 discloses amorphous terpolymers of TFE, MVE and perfluoroethylvinylether (EVE) suitable as thermoplastic coating. Similar amorphous copolymers, suitable as adhesive or coating compositions are also known from WO 99/32234 (DU PONT) 1 Jul. 1999, EP 1093485 A (DU PONT) 25 Apr. 2001, U.S. Pat. No. 6,880,238 (DU PONT) 19 Apr. 2005, U.S. Pat. No. 7,049,365 (E. I. DU PONT DE NEMOURS AND COMPANY) 15 Jul. 2004. Nevertheless, all these documents do not pertain to the domain of peroxide curable fluoroelastomers, nor teach about sealing properties of cured materials therefrom.

While thus terpolymers of TFE, MVE and perfluoroethylvinylether (EVE) are well-known in the art as thermoplastic materials, little or nothing is known about effects of modifying a curable perfluoroelastomer by addition of EVE for obtaining cured articles, in particular for improving thermal resistance.

DISCLOSURE OF INVENTION

The Applicant has now surprisingly found that when combining in a curable perfluoroelastomer recurring units derived from both EVE and MVE in well-defined amounts with tetrafluoroethylene, it is advantageously possible to significantly improve performances of perfluoroelastomers, in particular at temperatures exceeding 200° C.

It is thus an object of the invention a peroxide curable perfluoroelastomer comprising:
  recurring units derived from tetrafluoroethylene (TFE);
  recurring units derived from perfluoroethylvinylether (EVE), in an amount of between 2 and 17% by moles, with respect to total recurring units derived from TFE, perfluoromethylvinylether (MVE) and EVE; and
  recurring units derived from perfluoromethylvinylether (MVE), in an amount of between 23 and 35% by moles, with respect to total recurring units derived from TFE, perfluoromethylvinylether (MVE) and EVE.

The Applicant has surprisingly found that when combining recurring units derived from EVE and MVE in amounts as above described, it is advantageously possible to significantly improve performances of curable perfluoroelastomers, in particular at temperatures exceeding 200° C.

For the purpose of the invention, the term "perfluoroelastomer" is intended to denote a fluoroelastomer substantially free of hydrogen atoms. The term "substantially free of hydrogen atom" is understood to mean that the perfluoroelastomer consists essentially of recurring units derived from ethylenically unsaturated monomers comprising at least one fluorine atom and free of hydrogen atoms [per(halo)fluoromonomer (PFM)].

Minor amounts of moieties derived from hydrogen-containing recurring units might be present provided that they do not substantially affect properties of the perfluoroelastomer. An amount not exceeding 1% moles (preferably not exceeding 0.5% moles) with respect to total moles of TFE, EVE and MVE is generally considered as fulfilling the 'perfluoroelastomer' behaviour.

The perfluoroelastomer can comprise, in addition to recurring units derived from TFE, EVE and MVE, recurring units derived from one or more per(halo)fluoromonomer (PFM).

Should the perfluoroelastomer comprises recurring units derived from a per(halo)fluoromonomer (PFM) different from TFE, EVE and MVE, these recurring units are typically comprised in an amount not exceeding 5% moles, preferably not exceeding 3% moles, with respect to total moles of TFE, EVE and MVE.

Non limitative examples of suitable per(halo)fluoromonomers (REM) are notably:
  $C_3$-$C_8$ perfluoroolefins, such hexafluoropropene (HFP);
  bromo- and/or iodo $C_2$-$C_8$ (halo)fluoroolefins, such as bromotrifluoroethylene, iodotrifluoroethylene;
  per(halo)fluoroalkylvinylethers complying with general formula $CF_2=CFOR_{f3}$ in which $R_{f3}$ is a $C_2$-$C_6$ per(halo)fluoroalkyl, such as —$C_2F_5$, —$C_3F_7$, optionally comprising iodine or bromine atoms;
  per(halo)fluoro-oxyalkylvinylethers complying with general formula $CF_2=CFOX_{01}$, in which $X_{01}$ is a $C_1$-$C_{12}$ per(halo)fluorooxyalkyl having one or more ether groups, like perfluoro-2-propoxy-propyl group, optionally comprising iodine or bromine atoms;

per(halo)fluoro-methoxy-alkylvinylethers complying with general formula $CF_2$=$CFOCF_2OR_{f4}$ in which $R_{f4}$ is a $C_1$-$C_6$ per(halo)fluoroalkyl, such as —$CF_3$, —$C_2F_5$, —$C_3F_7$ or a $C_1$-$C_6$ per(halo)fluorooxyalkyl having one or more ether groups, such as —$C_2F_5$—O—$CF_3$, optionally comprising iodine or bromine atoms;

per(halo)fluorodioxoles of formula:

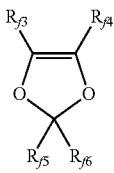

wherein each of $R_{f3}$, $R_{f4}$, $R_{f5}$, $R_{f6}$, equal of different each other, is independently a fluorine atom, a $C_1$-$C_6$ per(halo)fluoroalkyl group, optionally comprising one or more oxygen atom, e.g. —$CF_3$, —$C_2F_5$, —$C_3F_7$, —$OCF_3$, —$OCF_2CF_2OCF_3$ and optionally comprising iodine or bromine atoms; preferably a per(halo)fluorodioxole complying with formula here above, wherein $R_{f3}$ and $R_{f4}$ are fluorine atoms and $R_{f5}$ and $R_{f6}$ are perfluoromethyl groups (—$CF_3$) [perfluoro-2,2-dimethyl-1,3-dioxole (PDD)], or a per(halo)fluorodioxole complying with formula here above, wherein $R_{f3}$, $R_{f5}$ and $R_{f6}$ are fluorine atoms and $R_{f4}$ is a perfluoromethoxy group (—$OCF_3$) [2,2,4-trifluoro-5-trifluoromethoxy-1,3-dioxole or perfluoromethoxydioxole (MDO)].

Optionally, the perfluoroelastomer also comprises recurring units derived from a bis-olefin of general formula (I) here below:

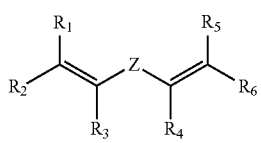

(I)

wherein:
$R_1$, $R_2$, $R_3$, $R_4$, $R_5$ and $R_6$, which may be identical or different from each other, are H or $C_1$-$C_5$ alkyl;
Z is a linear or branched $C_1$-$C_{18}$ alkylene or cycloalkylene radical, optionally containing oxygen atoms, preferably at least partially fluorinated, or a (per)fluoropolyoxyalkylene radical; examples of these bis-olefins are described, for example, in EP 0661304 A (AUSIMONT SPA [IT]) 5 Jul. 1995. Other examples are notably perfluoro-bis-vinyl-ethers.

The amount of chain units derived from these bis-olefins is generally between 0.01 and 1.0% by moles, preferably between 0.03 and 0.5 mol and even more preferably between 0.05 and 0.2% by moles with respect to the total moles of TFE, EVE and MVE recurring units.

The perfluoroelastomer of the invention is peroxide curable, that is to say that it is susceptible of being cured with the aid of peroxide radical initiators in suitable conditions and/or in combination with appropriate ingredients.

The perfluoroelastomer of the invention is peroxide curable, that is to say that it is susceptible of being cured with the aid of peroxide radical initiators in suitable conditions and/or in combination with appropriate ingredients. To this aim, the perfluoroelastomer of the invention typically comprises at least one of:
iodine and/or bromine atoms in the chain and/or in the end position of the perfluoroelastomer chain; and
recurring units derived from a cure-site monomer comprising a functional group of —CN type.

It is nevertheless generally preferred that the perfluoroelastomer of the invention comprises iodine and/or bromine atoms in the chain and/or in the end position of the perfluoroelastomer chain.

Preferably the perfluoroelastomer of the invention is free from recurring units derived from a cure-site monomer comprising a functional group of —CN type.

The introduction of these iodine and/or bromine atoms may be performed by adding, to the reaction mixture, brominated and/or iodinated comonomers, otherwise called brominated and/or iodinated cure-site comonomers. The perfluoroelastomer of this embodiment typically comprises, in addition to TFE, MVE and EVE recurring units, from 0.05 to 5% moles of recurring units derived from said brominated and/or iodinated comonomers.

Non limitative examples of said brominated and/or iodinated cure-site comonomers are notably:

$C_2$-$C_{10}$ bromine- and/or iodine-containing olefin, i.e. olefins in which at least one hydrogen atom has been replaced with a bromine atom or an iodine atom, respectively, and optionally, one or more of the remaining hydrogen atoms have been replaced with an atom of another halogen, preferably fluorine. Representative suitable bromine-containing olefins include bromotrifluoroethylene, 1-bromo-2,2-difluoroethylene, 4-bromo-3,3,4,4-tetrafluorobutene-1, vinyl bromide, 1-bromo-1,2,2-trifluoroethylene, perfluoroallyl bromide, 4-bromo-1,1,2-trifluorobutene, 4-bromo-1,1,3,3,4,4-hexafluorobutene, 4-bromo-3-chloro-1,1,3,4,4-pentafluorobutene, 6-bromo-5,5,6,6-tetrafluorohexene, 4-bromo-perfluorobutene-1, and 3,3-difluoroallylbromide. Representative suitable iodine-containing olefins include compounds of the formula $CH_2$=$CH(CF_2)_xI$ where x is 2-6, more specifically, iodoethylene, 3-chloro-4-iodo-3,4,4-trifluorobutene, 2-iodo-1,1,2,2-tetrafluoro-1-(vinyloxy)ethane, 2-iodo-1-(perfluorovinyloxy)-1,1,-2,2-tetrafluoroethylene, 1,1,2,3,3,3-hexafluoro-2-iodo-1-(perfluorovinyloxy)propane, 2-iodoethyl vinyl ether, 3,3,4,5,5,5-hexafluoro-4-iodopentene, iodotrifluoroethylene, and preferably 4-iodo-3,3,4,4-tetrafluorobutene-1. Use of these cure-site comonomers in elastomer manufacture has been notably described in U.S. Pat. No. 4,035,565 (DUPONT) 12 Jul. 1977, U.S. Pat. No. 4,694,045;

iodo- and/or bromo-containing fluorinated vinyl ethers; mention can be notably made of compounds described in U.S. Pat. No. 4,745,165 (AUSIMONT) 17 May 1988 and U.S. Pat. No. 4,564,662 (MINNESOTA MINING & MFG [US]) 14 Jan. 1986; a preferred class of these compound is notably that complying with formula $CF_2$=$CF$—O—$R'_f$—$CX_2Z$, wherein each of X, equal to or different from each other is H or F, Z is I or Br, and $R'_f$ is a divalent fluorocarbon group, preferably a —$(CF_2)_m$— group, with m=0 to 5.

As an alternative to or in combination with above mentioned brominated and/or iodinated cure-site comonomers, perfluoroelastomer of the invention may comprise iodine and/or bromine atoms in end-groups. These iodine and/or bromine atoms are typically introduced during manufacture of perfluoroelastomer, by polymerizing in the presence of iodinated and/or brominated chain-transfer agents. Among said chain-transfer agents mention can be made of (i) alkali metal or alkaline-earth metal iodides and/or bromides and (ii) iodine and/or bromine containing fluorocarbon compounds. In this view, preferred iodinated and/or brominated chain-transfer agents are those of formula $R_f(I)_x(Br)_y$, where $R_f$ is a (per)fluoroalkyl or a (per)fluorochloroalkyl containing from 1 to 8 carbon atoms, while x and y are integers between 0 and 2, with $1 \leq x+y \leq 2$. The use of these compounds for manufacturing fluoroelastomers is notably described in U.S. Pat. No. 4,243,770 (DAIKIN IND LTD) 6 Jan. 1981 and U.S. Pat. No. 4,943,622 (NIPPON MEKTRON KK [JP]) 24 Jul. 1990.

The perfluoroelastomer of the invention preferably consists essentially of recurring units derived from TFE, EVE and MVE, and, optionally from the bis-olefin as above detailed, and further comprises iodine and/or bromine atoms in end-groups.

The amount of recurring units derived from EVE is advantageously of at least 2%, preferably of at least 3%, more preferably of at least 4% by moles, with respect to total moles of TFE, EVE and MVE.

The amount of recurring units derived from EVE is advantageously of at most 17%, preferably of at most 15%, more preferably of at most 10% by moles, with respect to total moles of TFE, EVE and MVE.

The amount of recurring units derived from MVE is advantageously of at least 23%, preferably of at least 24%, more preferably of at least 25% by moles, with respect to total moles of TFE, EVE and MVE.

The amount of recurring units derived from MVE is advantageously of at most 35%, preferably of at most 33%, more preferably of at most 30% by moles, with respect to total moles of TFE, EVE and MVE.

When the amount of MVE is below 23% by moles, even if the polymer further comprises recurring units derived from EVE, polymer fails to provide adequate fluoroelastomer behaviour and suitable sealing features, but rather behaves as a thermoplastomer, which is out of the scope of present invention.

Data provided in the examples well demonstrate that the introduction of EVE recurring units in amounts as above specified enables optimization of the sealing properties (improved compression sets), in particular at high temperatures.

It is also understood that it is generally preferred that the perfluoroelastomer of the invention comprises recurring units derived from both EVE and MVE in an amount of from 26 to 42 by moles, more preferably from 28 to 40% by moles, most preferably from 28 to 37% by moles, with respect to total moles of TFE, EVE and MVE.

Preferred perfluoroelastomers of the invention are those consisting essentially of:
from 60 to 75% moles of recurring units derived from TFE;
from 2 to 17% moles of recurring units derived from EVE;
from 23 to 35% moles of recurring units derived from MVE; and
further comprising iodine and/or bromine (preferably iodine) in end-groups.

More preferred perfluoroelastomers of the invention are those consisting essentially of:
from 65 to 70% moles of recurring units derived from TFE;
from 4 to 10% moles of recurring units derived from EVE;
from 25 to 30% moles of recurring units derived from MVE; and
further comprising iodine and/or bromine (preferably iodine) in end-groups.

The preparation of the fluoroelastomer of the invention may be performed by copolymerizing the monomers in aqueous emulsion, according to methods that are well known in the art, in the presence of radical initiators (for example alkali metal or ammonium persulfates, perphosphates, perborates or percarbonates), optionally in combination with ferrous, cuprous or silver salts, or salts of other readily oxidizable metals. Surfactants of various types are usually also present in the reaction medium, among which fluorinated surfactants are more particularly preferred.

As an alternative to emulsion polymerization, the polymerization reaction to obtain the perfluoroelastomer may be performed in bulk or in suspension, in an organic liquid in which a suitable radical initiator is present, according to well-known techniques.

The polymerization reaction is generally performed at temperatures of between 25 and 150° C., at a pressure of up to 10 MPa.

The preparation of the perfluoroelastomer is preferably performed as a microemulsion of perfluoropolyoxyalkylenes, as notably described in U.S. Pat. No. 4,789,717 (AUSIMONT SPA [IT]) 6 Dec. 1988 and U.S. Pat. No. 4,864,006 (AUSIMONT SPA [IT]) 5 Sep. 1989.

The perfluoroelastomer of the present invention are typically cured via peroxide vulcanization.

The peroxide-mediated vulcanization can be performed according to known techniques, via the addition of suitable peroxide capable of generating radicals by thermal decomposition.

Curable composition comprising the perfluoroelastomer of the invention thus typically comprises at least one peroxide, preferably at least one organic peroxide.

Said peroxide is typically used in amount of 0.05 to 10%, preferably of 0.5 to 5% by weight relative to the perfluoroelastomer.

Among the most commonly used peroxides, mention may be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl] carbonate.

Curable compound comprising the perfluoroelastomer of the invention can generally comprise additional ingredients, preferably selected from the group consisting of:
(a') vulcanization coagents, in an amount generally of between 0.5% and 10% and preferably between 1% and 7% by weight relative to the perfluoroelastomer;
(b') optionally, a metallic compound, in an amount of between 1% and 15% and preferably between 2% and 10% by weight relative to the polymer, preferably chosen from oxides and hydroxides of divalent metals, for instance Mg, Zn, Ca or Pb, optionally combined with a salt of a weak acid, for instance stearates, benzoates, carbonates, oxalates or phosphites of Ba, Na, K, Pb or Ca;
(c') optionally, acid acceptors of metal non-oxide type such as 1,8-bis(dimethylamino)naphthalene, octadecylamine, etc. as described in EP 708 797;
(d') optionally, other conventional additives, such as thickening fillers, preferably carbon black, silica, semicrystalline fluoropolymers consisting of TFE homopolymers or copolymers of TFE with one or more monomers containing at least one unsaturation of ethylenic type, in an amount of from 0.01 mol % to 10 mol % and preferably from 0.05 mol % to 7 mol %; pigments, antioxidants, stabilizers and the like.

Among vulcanization coagents, mention can be notably made of triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl-methyltrisiloxane, and bis-olefins of formula (I) as above detailed. In case of perfluoroelastomers comprising recurring units derived from cyano (—CN) containing monomers, aromatic polyamines compounds and/or organotin compounds can be used as vulcanization coagents.

Among polyamine compounds, mention can be notably made of compounds of formula:

$H_2N-Ar-NH_2$ with Ar being an aromatic group of formula:

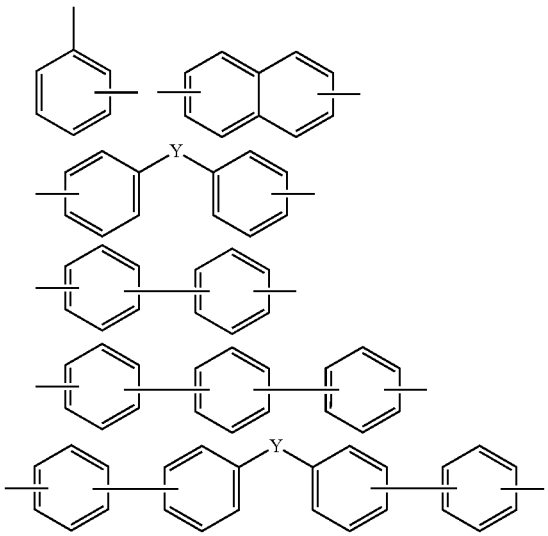

and corresponding optionally substituted structures (e.g. further comprising hydroxyl groups), with Y being —O—, —S—, —SO$_2$—, —CH$_2$—, —C(O)—, —C(CF$_3$)$_2$—, —C(CH$_3$)$_2$—, —(CH$_2$)$_n$—, —(CF$_2$)$_n$—, n being an integer from 0 to 5.

Among organotin compounds, mention can be notably made of those of formula Ar'$_x$SnY$_{4-x}$, wherein Ar' is an aromatic group, optionally comprising condensed rings, Y is an organic group comprising a carbon-carbon double bond, preferably an allyl, allenyl, propargyl group, and x is an integer from 0 to 3.

Among thickening fillers, silica fillers are those preferred for achieving improved thermal resistance. Among those silica fillers, silica having a pH value, determined according to the DIN ISO 787-9 standard, higher than 7, and/or silica having hydrophobic behaviour are preferred. The use of these silica fillers in fluoroelastomer is notably described in WO 2008/003634 (SOLVAY SOLEXIS SPA [IT];) 10 Jan. 2008 and in WO 2008/003635 (SOLVAY SOLEXIS SPA [IT];) 10 Jan. 2008.

In cases wherein improved water vapour resistance, especially at high temperature, is sought, carbon black fillers, and more particularly, those carbon black fillers having CTAB of 25 to 35 m$^2$/g are preferred; these fillers are notably described in WO 2008/003636 (SOLVAY SOLEXIS SPA [IT];) 10 Jan. 2008.

The invention also pertains to cured articles made from the perfluoroelastomer of the invention.

The cured articles of the invention are typically manufactured by a process comprising:
providing a curable perfluoroelastomer composition comprising the perfluoroelastomer and the peroxide, as above detailed;
vulcanizing-molding said composition to yield shaped pre-formed sealing articles; and
optionally, thermally post-treating said shaped pre-formed sealing articles to yield the cured articles.

In general, the curable perfluoroelastomer composition is molded and simultaneously vulcanized using techniques such as injection-moulding or compression-moulding, or alternatively by extrusion-moulding.

While temperature at which the vulcanizing-moulding is not particularly limited, temperatures of between about 50° C. and about 250° C. and preferably between about 100° C. and about 220° C. are generally used.

The skilled in the art will thus select the appropriate curing/vulcanization recipe (peroxide, vulcanization coagents . . . ) so as to obtain appropriate curing at the selected temperature.

After vulcanization-moulding, the vulcanized shaped pre-formed sealing articles can be subjected to a subsequent thermal post-treatment step. This treatment is generally performed in suitable heating devices, generally electric ovens or convection ovens.

The thermal post-treatment is generally performed for a time from at least two minutes to 36 hours, preferably from 30 minutes to 24 hours and more preferably from 1 hour to 12 hours.

Temperature of such post-treatment is not particularly limited; it is generally understood that this post-treatment (elsewhere known as post-cure) is typically carried out at temperatures between 150 and 350° C., preferably between 200 and 300° C.

The invention will be now described in more detail with reference to the following examples whose purpose is merely illustrative and not intended to limit the scope of this invention.

EXAMPLES

General Compounding and Curing Procedure

Fluoroelastomers described below have been formulated with or without additives/ingredients mentioned in the below embedded tables; addition of said additives/ingredients has been carried out following compounding procedures described in ASTM D 3182 standard; cured specimens have been prepared following procedure described in same standard.

Determination of Mechanical and Sealing Properties on Cured Samples

Tensile properties were determined on specimens punched off from plaques, following ASTM D412 standard, method C.

M 100 is the stress in MPa for an elongation of 100%
T.S. is the stress at break in MPa;
E.B. is the elongation at break in %.
Shore A (3") hardness (HDS) has been determined according to ASTM
D2240-Type A Durometer standard at 25° C.

Compression set (CS) has been determined on type 214 O-rings according to ASTM D395 and D1414 standards. The procedure according to ASTM D395 and D1414 standards are as follows. Specifically, according to ASTM D395:

A dial micrometer, for measuring the specimen thickness, is used in accordance with Practice D3767Method A 1. For vulcanizates having a hardness below 35 IRHD, the force on the presser foot should be reduced to 0.2±0.05 N (0.04±0.01 lbf).

Spacer bars for Type 1 samples shall have a thickness of 9.5±0.02 mm (0.375±0.001 in.). Spacer bars for Type 2 samples shall have a thickness of 4.50±0.01 mm (0.1770±0.0005 in.).

A compression device consisting of two or more flat steel plates between the parallel faces of which the specimens may be compressed is used. Steel spacers for the required percentage of compression given below shall be placed on each side of the rubber specimens to control their thickness while compressed. The steel surfaces contacting the rubber specimens shall be ground to a maximum roughness of 250 μm (10 μin.) and then chromium plated and polished. For the oven, see D395, 8.4.

The plates between which the test specimen is compressed shall be made of steel of sufficient thickness to withstand the compressive stresses without bending. The surfaces against which the specimen is held shall have a chromium-plated finish and shall be cleaned thoroughly and wiped dry before each test. The steel surfaces contacting the rubber specimens shall be ground to a maximum roughness of 250 μm (10 μin.) and then chromium plated and polished. The chromium plating and subsequent polishing shall not affect the final finish beyond the tolerance stated in above.

Original Thickness Measurement: Measure the original thickness of the specimen to the nearest 0.02 mm (0.001 in.). Place the specimen on the anvil of the dial micrometer so that the presser foot will indicate the thickness at the central portion of the top and bottom faces.

Application of Compressive Force: Place the test specimen between the plates of the compression device with the spacers on each side, allowing sufficient clearance for the bulging of the rubber when compressed. Where a lubricant is applied, it shall consist of a thin coating of a lubricant having substantially no action on the rubber. For most purposes, a silicon or fluorosilicon fluid is suitable. Tighten the bolts so that the plates are drawn together uniformly until they are in contact with the spacers. The amount of compression employed shall be approximately 25%. A suitable mechanical or hydraulic device may be used to facilitate assembling and disassembling the test fixture.

Test Time and Temperature: Choose a suitable temperature and time for the compression set, depending upon the conditions of the expected service. In comparative tests, use identical temperature and test periods. It is suggested that the test temperature be chosen from those listed in Practice D 1349. Suggested test periods are 22 h and 70 h. The test specimen shall be at room temperature when inserted in the compression device. Place the assembled compression device in the oven within 2 h after completion of the assembly and allow it to remain there for the required test period in dry air at the test temperature selected. At the end of the test period, take the device from the oven and remove the test specimen immediately and allow them to cool.

Cooling Period: While cooling, allow the specimens to rest on a poor thermally conducting surface, such as wood, for 30 min before making the measurement of the final thickness. Conduct the cooling period at a standard laboratory temperature of 23±2° C. (73.4±3.6° F.). Specimens whose compression set property is affected by atmospheric moisture shall be cooled in an atmosphere controlled to 50±5% relative humidity.

Final Thickness Measurement: After the rest period, measure the final thickness at the center of the test specimen in accordance the same procedure used for the Original Thickness Measurement.

Calculate the compression set expressed as a percentage of the original deflection as follows:

$$C_B = [(t_0 - t_i)/(t_0 - t_n)] \times 100$$

where:

$C_B$=compression set expressed as percentage of the original deflection.
$t_0$=original thickness of specimen,
$t_i$=final thickness of specimen, and
$t_n$=thickness of the spacer bar used.

Per ASTM D1414, the compression set of O-ring specimens shall follow the general procedures of ASTM D395 above, with the following exceptions:

Spacers: The spacers shall be adjusted to within 0.025 mm (0.01 in.). This can be done by employing shim stock of various thickness.

Measurement: The cross section before and after test shall be measured in the same marked location with a ball-point (tubing) micrometer or other method as described below:

The thickness or cross section may be measured by one of the following methods: (a) a hand micrometer equipped with 6-mm (0.25-in.) diameter hemispherical tips (ball-point or tubing micrometers), (b) dial indicators that have a maximum contact force of 0.29 N (29 gf), or (c) an electronic micrometer with a spring force of 0.1 N (10 gf) maximum. Better accuracy can be obtained with a 0.05-N (5-gf) spring or with no spring. In case of referee tests, both laboratories shall use the same spring force.

The O-ring specimen shall be measured at four points equally distributed around the circumference in both the radial and axial direction. An average reading shall be used for calculation.

Test Specimen: The specimen shall be a suitable section cut from the sample O-ring. A 52-mm (2-in.) section has been found to be satisfactory on sample O-rings of 17-mm (0.67-in.) or larger inside diameter. On smaller O-rings, a section of approximately 3 mm (⅛ in.) shall be cut from the sample and discarded.

Testing a whole O-ring for compression set is always avoided because air trapped inside the O-ring results in a different set of conditions on the inside and outside surface of the specimen.

Procedure: Measure the actual specimen to within 0.025 mm (0.001 in.) and calculate the spacer to be 75% of this thickness, to within 0.025 mm (0.001 in.). Close the plates, employing a sufficient number of bolts to prevent deflection upon heating. At the end of the heating period, release the plates as soon as possible and allow the specimens to cool to room temperature under the conditions described above.

Example 1

In a 10-liters stainless steel autoclave equipped with mechanical stirrer operating at 545 rpm, 6.2 liters of demineralized water and 62 ml of a microemulsion preliminarly obtained by mixing 13.5 ml of a perfluoropolyether having carboxylic end-group of formula: $CF_2ClO(CF_2-CF(CF_3)O)_n(CF_2O)_mCF_2COOH$, with n/m=10 and average molecular weight of 600 g/mol; 13.5 ml of a $NH_4OH$ 30% v/v aqueous solution; 27 ml of demineralized water; 8 ml of a GALDEN® D02 perfluoropolyether of formula: $C-F-_3-O-(CF_2-CF(CF_3)O)_n(CF_2O)_mCF_3$ with n/m=20 and molecular weight of 450 g/mol were introduced.

Reactor was thus heated to set-point temperature of 80° C.; then 18 g of 1,4-diiodoperfluorobutane ($C_4F_8I_2$) were added, followed by a monomers mixtures having following composition: tetrafluoroethylene (TFE) 45% moles, perfluoroethylvinylether (EVE) 10% moles, perfluoromethylvinylether (MVE) 45% until a final pressure of 20 bar (2 MPa), 0.31 g of ammonium persulfate (APS) and 8.6 g of $CH_2=CH-(CF_2)_6-CH=CH_2$, fed in 20 portions each 5% increase in conversion.

Set-point pressure of 20 bar was maintained by feeding a monomers mixture composed of TFE 63% moles, EVE 4% moles, MVE 33% moles; after having fed 3 kg of monomers mixture (corresponding to a total reaction time of 249 minutes), reactor was cooled and a latex comprising 311 $g_{polymer}/kg_{latex}$ was recovered. Latex was then coagulated and purified under the form of a gel following procedure described in EP 1626068 A (SOLVAY SOLEXIS SPA [IT]) 15 Feb. 2006. After drying at 90° C. for 16 hours, a polymer composed of TFE 67.8% moles; EVE 4.3% moles; MVE 27.9% moles, whose properties are summarized in Table 1 was obtained.

Example 2

Same procedure as example 1 was repeated but feeding for maintaining set-point pressure a mixture of TFE: 63% moles; EVE 6% moles; MVE: 31% moles. Reaction was pursued during 238 minutes, obtaining latex having a solids content of 296 $g_{polymer}/kg_{latex}$. After coagulation as above described, a latex having composition TFE 67.9% moles; EVE 6.1% moles; MVE 26.0% moles was obtained, whose properties are summarized in Table 1.

Example 3

Same procedure of example 1 was repeated, but in the initial pressurizing step, reactor was loaded with a monomers mixture having following composition: TFE 45% moles; EVE 15% moles; MVE 40% moles, for reaching set-point pressure of 20 bar relative, which was maintained feeding a mixture having following composition: TFE 55% moles; EVE 12% moles; MVE 33% moles.

After 232 minutes of reaction, a latex having a solids content of 306.5 $g_{polymer}/kg_{latex}$ was obtained. After coagulation as described in example 1, a polymer having following composition (as determined by NMR) was obtained: TFE 63.9% moles; EVE 10.1% moles; MVE 26.0% moles. Properties are summarized in Table 1.

Example 4

Same procedure as in example 1 was repeated, except that set-point pressure was maintained by feeding a monomer mixture having following composition: TFE 67% moles; EVE 5% moles; MVE 28% moles.

After 210 minutes of reaction, a latex having a solids content of 318.1 $g_{polymer}/kg_{latex}$ was obtained. After coagulation as described in example 1, a polymer having following composition (as determined by NMR) was obtained: TFE 71.5% moles; EVE 4.6% moles; MVE 23.9% moles. Properties are summarized in Table 1.

Comparative Example 5

As in comparative example 3, commercially available TECNOFLON® PFR95HT TFE-MVE perfluoroelastomer from Solvay Solexis was used.

TABLE 1

| Run | | Ex. 1 | Ex. 2 | Ex. 3 | Ex. 4 | Ex. 5C |
|---|---|---|---|---|---|---|
| MVE | % mol | 28 | 26 | 26 | 24 | 34 |
| EVE | % mol | 4 | 6 | 10 | 4.5 | 0 |
| Tg | ° C. | 2.1 | 2.7 | 2.1 | 6.1 | 0 |
| Compound recipe | | | | | | |
| elastomer | phr | 100 | 100 | 100 | 100 | 100 |
| Bis-olefin[2] | phr | 1.5 | 1.5 | 1.5 | 1.5 | 1.5 |
| peroxide[3] | phr | 1 | 1 | 1 | 1 | 1 |
| ZnO | phr | 5 | 5 | 5 | 5 | 5 |
| CB[4] | phr | 8 | 8 | 8 | 8 | 8 |
| CB[5] | phr | 7 | 7 | 7 | 7 | 7 |
| Mechanical properties[6] | | | | | | |
| TS | MPa | 18.1 | 18.4 | 17.5 | 18 | 20 |
| EB | % | 186 | 218 | 270 | 195 | 180 |
| HDS | Shore A | 72 | 72 | 70 | 75 | 73 |
| Compression set[7] 70 h @ 316° C. | | | | | | |
| CS | % | 38 | 38 | 37 | 36 | 65 |

[1]Mooney viscosity (2 + 9) at 121° C.;
[2]bis-olefin of formula: $CH_2=CH-(CF_2)_6-CH=CH_2$;
[3]LUPEROX ® 101XL: neat liquid 2,5-dimethyl-2,5-bis(tert-butylperoxy)hexane;
[4]Carbon black MT N 990
[5]Austin black 325 filler, commercially available from Coal Fillers Incorporated;
[6]Carried out on post-cured specimens; vulcanizing-moulding and post-curing conditions: Cure: 20 min at 175° C.; post-cure: (8 + 16)h at 290° C.
[7]CS on #214 O-ring.

Data provided herein above show that sealing properties at high temperature (as expressed by above detailed compression set values) are far improved for the perfluoroelastomers of the present invention with respect to those of materials of comparative examples.

Example 6

Same polymer as that of example 1 was used. Properties are summarized in Table 2.

Example 7

Same polymer as that of example 1 was used. Properties are summarized in Table 2.

TABLE 2

| Run | | Ex. 6 | Ex. 7 |
|---|---|---|---|
| MVE | % mol | 28 | 28 |
| EVE | % mol | 4 | 4 |
| Tg | (° C.) | 2.1 | 2.1 |
| Compound recipe | | | |
| elastomer | phr | 100 | 100 |
| Bis-olefin[2] | phr | 1.5 | — |
| TAIC[9] | phr | — | 3 |
| peroxide[3] | phr | 2 | 1.5 |

TABLE 2-continued

| Run | Ex. 6 | Ex. 7 |
|---|---|---|
| Mechanical properties[10] | | |
| TS MPa | 21.5 | 18.8 |
| EB % | 215 | 185 |
| HDS Shore A | 68 | 70 |
| Compression set[11] 70 h @ 200° C. | | |
| CS % | 22 | 18 |

[2)-(3)]same as in Table 1;
[9]TAICROS ® TAIC: liquid triallylisocyanurate commercially available from Evonik;
[10]Carried out on post-cured specimens; vulcanizing-moulding and post-curing conditions: Cure: 20 min at 160° C.; post-cure: (8 + 16) h at 230° C.
(7) CS on #214 O-ring.

Data provided herein above show that, even in the absence of fillers, mechanical properties and sealing properties of cured perfluoroelastomers of the present invention are excellent.

The invention claimed is:

1. A peroxide curable perfluoroelastomer comprising:
    recurring units derived from tetrafluoroethylene (TFE);
    recurring units derived from perfluoroethylvinylether (EVE), in an amount of between 2 and 17% by moles, with respect to total recurring units derived from TFE, perfluoromethylvinylether (MVE) and EVE;
    recurring units derived from perfluoromethylvinylether (MVE), in an amount of between 23 and 35% by moles, with respect to total recurring units derived from TFE, perfluoromethylvinylether (MVE) and EVE; and
    iodine and/or bromine atoms in the chain and/or in the end position of the perfluoroelastomer chain,
    wherein, after curing, the perfluoroelastomer exhibits a compression set of 38% or less at temperatures of 200° C. for 70 hours when determined on type 214 O-rings according to ASTM D395 and D1414 standards.

2. The perfluoroelastomer of claim 1, said perfluoroelastomer further comprising, in addition to recurring units derived from TFE, EVE and MVE, recurring units derived from one or more per(halo)fluoromonomer (PFM).

3. The perfluoroelastomer of claim 2, wherein said per(halo)fluoromonomer (PFM) is selected from the group consisting of:
    $C_3$-$C_8$ perfluoroolefins;
    bromo- and/or iodo $C_2$-$C_8$ (halo)fluoroolefins;
    per(halo)fluoroalkylvinylethers complying with general formula $CF_2$=$CFOR_{f3}$ in which $R_{f3}$ is a $C_2$-$C_6$ per(halo)fluoroalkyl, optionally comprising iodine or bromine atoms;
    per(halo)fluoro-oxyalkylvinylethers complying with general formula $CF_2$=$CFOX_{01}$, in which $X_{01}$ is a $C_1$-$C_{12}$ per(halo)fluorooxyalkyl having one or more ether groups, optionally comprising iodine or bromine atoms;
    per(halo)fluoro-methoxy-alkylvinylethers complying with general formula $CF_2$=$CFOCF_2OR_{f4}$ in which $R_{f4}$ is a $C_1$-$C_6$ per(halo)fluoroalkyl, or a $C_1$-$C_6$ per(halo) fluorooxyalkyl having one or more ether groups, optionally comprising iodine or bromine atoms;
    per(halo)fluorodioxoles of formula:

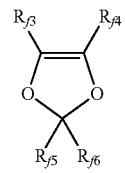

wherein each of $R_{f3}$, $R_{f4}$, $R_{f5}$, $R_{f6}$, equal to or different from each other, is independently a fluorine atom, a $C_1$-$C_6$ per(halo)fluoroalkyl group, optionally comprising one or more oxygen atom, and optionally comprising iodine or bromine atoms.

4. The perfluoroelastomer of claim 1, said perfluoroelastomer further comprising recurring units derived from a bis-olefin of general formula (I) here below:

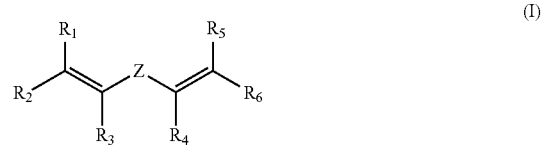

wherein:
    $R_1$, $R_2$, $R_3$, $R_4$, $R_5$ and $R_6$, which are identical or different from each other, are H or $C_1$-$C_5$ alkyl;
    Z is a linear or branched $C_1$-$C_{18}$ alkylene or cycloalkylene radical, optionally containing oxygen atoms, or a (per)fluoropolyoxyalkylene radical.

5. The perfluoroelastomer of claim 1, wherein, after curing, the perfluoroelastomer exhibits a compression set of 36% to 48% at 316° C. for 70 hours when determined on type 214 O-rings according to ASTM D395 and D1414 standards.

6. The perfluoroelastomer of claim 1, wherein, after curing, the perfluoroelastomer exhibits a compression set of 18% to 22% at 200° C. for 70 hours when determined on type 214 O-rings according to ASTM D395 and D1414 standards.

7. A process for manufacturing the perfluoroelastomer according to claim 1.

8. Cured articles made from the perfluoroelastomer of claim 1.

9. A peroxide curable perfluoroelastomer consisting essentially of:
    recurring units derived from tetrafluoroethylene (TFE);
    recurring units derived from perfluoroethylvinylether (EVE), in an amount of between 2 and 17% by moles, with respect to total recurring units derived from TFE, perfluoromethylvinylether (MVE) and EVE;
    recurring units derived from perfluoromethylvinylether (MVE), in an amount of between 23 and 35% by moles, with respect to total recurring units derived from TFE, perfluoromethylvinylether (MVE) and EVE;
    iodine and/or bromine atoms in the chain and/or in the end position of the perfluoroelastomer chain; and
    optionally recurring units derived from a bis-olefin of general formula (I):

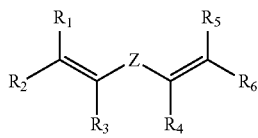

wherein:

$R_1$, $R_2$, $R_3$, $R_4$, $R_5$ and $R_6$, which are identical or different from each other, are H or $C_1$-$C_5$ alkyl; and Z is a linear or branched $C_1$-$C_{18}$ alkylene or cycloalkylene radical, optionally containing oxygen atoms, or a (per)fluoropolyoxyalkylene radical, and further comprising iodine and/or bromine atoms in end-groups, wherein, after curing, the perfluoroelastomer exhibits a compression set of 38% or less at temperatures of 200° C. for 70 hours when determined on type 214 O-rings according to ASTM D395 and D1414 standards.

10. The perfluoroelastomer of claim 9, said perfluoroelastomers consisting essentially of:

optionally recurring units derived from a bis-olefin of general formula (I):

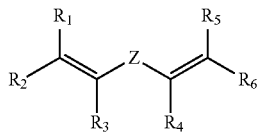

wherein:

$R_1$, $R_2$, $R_3$, $R_4$, $R_5$ and $R_6$, which are identical or different from each other, are H or $C_1$-$C_5$ alkyl; and Z is a linear or branched $C_1$-$C_{18}$ alkylene or cycloalkylene radical, optionally containing oxygen atoms, or a (per)fluoropolyoxyalkylene radical, and further comprising iodine and/or bromine atoms in end-groups;

from 60 to 75% moles of recurring units derived from TFE;

from 2 to 17% moles of recurring units derived from EVE;

from 23 to 35% moles of recurring units derived from MVE; and further comprising iodine and/or bromine in end-groups.

11. The perfluoroelastomer of claim 10, said perfluoroelastomers consisting essentially of:

optionally recurring units derived from a bis-olefin of general formula (I):

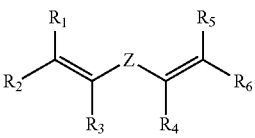

wherein:

$R_1$, $R_2$, $R_3$, $R_4$, $R_5$ and $R_6$, which are identical or different from each other, are H or $C_1$-$C_5$ alkyl; and Z is a linear or branched $C_1$-$C_{18}$ alkylene or cycloalkylene radical, optionally containing oxygen atoms, or a (per)fluoropolyoxyalkylene radical, and further comprising iodine and/or bromine atoms in end-groups;

from 65 to 70% moles of recurring units derived from TFE;

from 4 to 10% moles of recurring units derived from EVE;

from 25 to 30% moles of recurring units derived from MVE; and further comprising iodine and/or bromine in end-groups.

12. A curable composition comprising the perfluoroelastomer according to claim 1, and further comprising at least one peroxide, said peroxide being present in an amount of 0.05 to 10% by weight relative to said perfluoroelastomer.

13. The curable composition of claim 12, wherein said peroxide is selected from the group consisting of di-tert-butyl peroxide, 2,5-dimethyl-2,5-bis(tert-butylperoxy)hexane, dicumyl peroxide, dibenzoyl peroxide, di-tert-butyl perbenzoate, and bis[1,3-dimethyl-3-(tert-butylperoxy)butyl] carbonate.

14. The curable composition of claim 12, said composition comprising one or more additional ingredients selected from the group consisting of:

(a') vulcanization coagents, in an amount generally of between 0.5% and 10% by weight relative to said perfluoroelastomer;

(b') a metallic compound, in an amount of between 1% and 15% by weight relative to the polymer, said metallic compound being selected from the group consisting of oxides and hydroxides of divalent metals, optionally combined with a salt of a weak acid;

(c') acid acceptors of metal non-oxide type;

(d') other conventional additives selected from the group consisting of thickening fillers, pigments, antioxidants, and stabilizers.

15. A process for manufacturing the cured articles, said process comprising:

providing the curable perfluoroelastomer composition of claim 12;

vulcanizing-moulding said composition to yield shaped pre-formed sealing articles; and optionally, thermally post-treating said shaped pre-formed sealing articles to yield the cured articles.

16. Cured articles made from the curable composition of claim 12.

* * * * *